United States Patent [19]
Tyler

[11] 3,788,182
[45] Jan. 29, 1974

[54] CUTTING TOOLS WITH ROUND FACE TOOTH INSERTS

[75] Inventor: Robert P. Tyler, Westminister, Mass.

[73] Assignee: Wallace-Murray Corporation, Fitchburgh, Mass.

[22] Filed: Sept. 7, 1972

[21] Appl. No.: 286,956

[52] U.S. Cl. ............... 83/835, 76/112, 29/95, 144/218
[51] Int. Cl. .................. B27b 33/02, B27g 13/08
[58] Field of Search ........... 144/218; 76/112; 29/95; 83/835, 846, 853, 697

[56] References Cited
UNITED STATES PATENTS

| 3,537,491 | 11/1970 | Kolesh | 144/218 X |
| 3,104,562 | 9/1963 | Kolesh | 76/112 |

*Primary Examiner*—Donald R. Schran

[57] ABSTRACT

Saws have teeth inserts which present on each tooth a circular cutting edge resulting from truncating spheres of hard or hardenable material to form round surfaces facing the direction of sawing motion and presenting round cutting edges at the teeth tips having a positive or negative rake as desired.

5 Claims, 6 Drawing Figures

PATENTED JAN 29 1974　　3,788,182

CUTTING TOOLS WITH ROUND FACE TOOTH INSERTS

This invention relates to carbide-tipped saws and more particularly to carbide-tipped saws having carbide tips of novel configuration rendering the saws less expensive to manufacture and easier to maintain and to a method of making such saws.

BACKGROUND OF THE INVENTION

The welding of spherically-shaped inserts of a hard metal into the tooth tip portions of a saw has been described in U.S. Pat. No. 3,104,562. Such spherically-shaped inserts have certain advantages over rectangular inserts as described in said patent. Nevertheless, in finishing such tips, the several faces including the leading face, the two side faces and the trailing face were all ground and in separate operations. In U.S. Pat. No. 3,537,491 carbide balls were also used, being ground to present cutting edges which were either curved in a plane of revolution of a circular saw (FIG. 3) or in a plane perpendicular thereto (FIGS. 6 and 7) or only slightly tilted out of one of said planes (FIGS. 10–13) i.e., at a backward angle of more than 180° to the direction of saw motion.

SUMMARY OF THE INVENTION

In accordance with this invention, while spherical inserts are still used, each finished tooth is produced by only a single grinding operation which truncates the sphere in such manner that the finished tooth presents a round nose facing the direction of sawing movement of the blade and has a cutting edge having a rake anywhere from 30° positive to 30° negative. By the use of such construction, balls of varying diameters may be used depending upon how large a kerf is desired and the inserts may be ground to any distance beyond the centers giving more and more top, back and side clearances automatically as the grinding proceeds.

Typical embodiments of the invention are shown in the accompanying drawings wherein.

DESCRIPTIONS OF SPECIFIC EMBODIMENTS OF THE INVENTION

Figure 1:
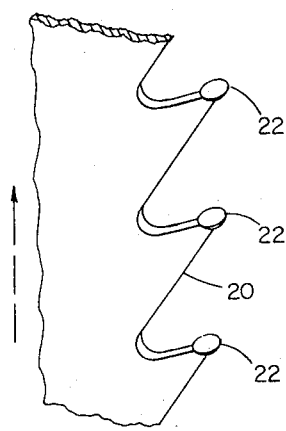
FIG. 1 is a perspective view of a carbide-tipped saw of the invention with the direction of sawing movement being upwardly as indicated by the arrow.

FIG. 1 shows a portion of a band saw having steel teeth 20 and inserted ground carbide tips 22.

Figure 2:
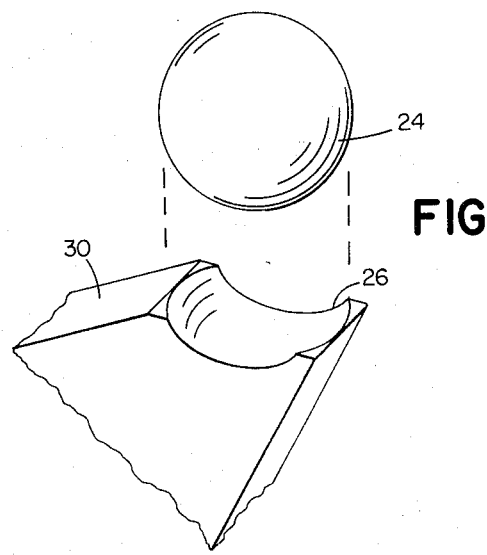
FIG. 2 is an exploded view of a portion of a saw tooth having a spherical cavity into which a sphere of carbide is inserted.
Figure 3:
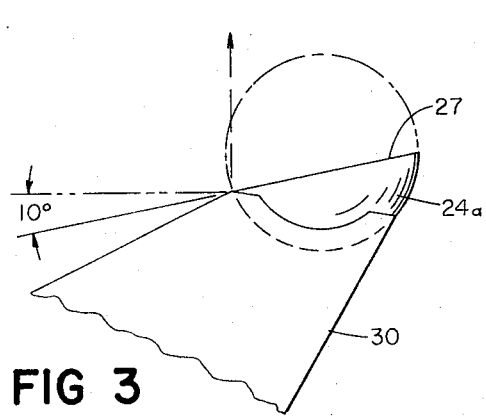
FIG. 3 is a side elevational view of the detailed section of a tooth shown in FIG. 2 with the carbide ball thereof (indicated by the dot and dash line) seated and then finished to provide a circular carbide cutting edge.
Figure 4:
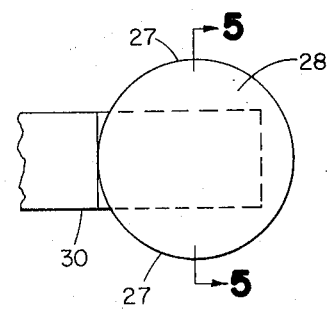
FIG. 4 is a plan view of the carbide-tipped tooth shown in FIG. 3.
Figure 5:
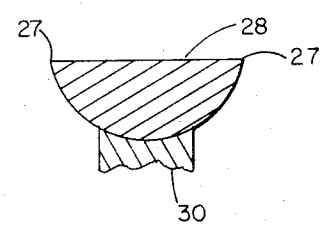
FIG. 5 is a cross-sectional view taken along the line 5—5 of FIG. 4.

The tips are formed from spheres one of which is shown as 24 in FIG. 2 which are seated in spherical cavities 26 which are self-formed in the leading edges of the different teeth if the balls are affixed by welding; or in some instances the spherical cavities may be preformed before inserting and affixing the balls by welding means. After the spheres are fixed in the cavities, the spheres are truncated to give a positive or negative rake. Thus in FIG. 3 the rake is 10° positive, the direction of sawing motion being indicated by the arrow, but it could be anywhere from 0° to 30° positive. The diameter of the flat truncating surface is left greater than the thickness of the saw blade teeth 30 so as to make circular edge 27 have kerf-cutting portions extending outwardly on both sides and beyond the body of the saw as indicated in FIG. 5.

Figure 6:
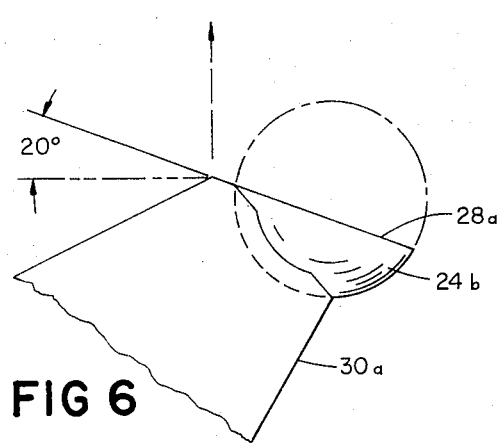
FIG. 6 is a detail side elevational view of a modified form of the invention wherein the carbide tip has a negative rake as contrasted with the positive rake of the tip of FIG. 3.

In FIG. 6 the tooth 30a is of different contour so as to seat a ball 24b which is truncated so that its circular truncating surface 28a provides a tip having a rake of 20° negative, the direction of sawing motion again being indicated by the arrow. But the rake could be anywhere from 0°–30° negative.

The sphere inserts may be of any hard material which will function to increase the cutting life of the saw as a whole and may be applied, if desired, to the teeth of circular saws, band saws, hack saws, Sabre saws, milling cutters and other cutting tools.

What is claimed is:

1. A saw blade having
teeth spaced along an edge thereof
a truncated sphere affixed to the leading edge of each tooth, the truncating surface of said sphere extending all the way across the leading edge of each tooth and forming a succession of circular edges lying in planes disposed at angles to the direction of cutting motion of said blade and forming a circular cutting edge at the tip of each tooth.

2. A saw blade as claimed in claim 1 wherein the diameters of said circular edges are uniform and exceed the thickness of said teeth to present curved kerf-forming cutting edges on the sides of the teeth.

3. A saw blade as claimed in claim 1 wherein the angles are the same and provide a 0°–30° positive rake for the teeth.

4. A saw blade as claimed in claim 1 wherein the angles are the same and provide a 0°–30° negative rake for the teeth.

5. The method of making a saw blade with circular cutting edges on each tooth comprising affixing a ball to the leading edge of each tooth and then grinding the ball beyond its center to create a circular cutting edge lying in a plane providing a tooth tip having a rake between 30° positive and 30° negative.

* * * * *